(12) United States Patent
Takahashi et al.

(10) Patent No.: US 9,406,275 B2
(45) Date of Patent: Aug. 2, 2016

(54) IMAGE PROCESSING DEVICE AND IMAGE PROCESSING METHOD

(71) Applicant: SAMSUNG DISPLAY CO., LTD., Yongin, Gyeonggi-Do (KR)

(72) Inventors: Seiki Takahashi, Yokohama (JP); Hiroshi Ohishi, Yokohama (JP)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/594,426

(22) Filed: Jan. 12, 2015

(65) Prior Publication Data
US 2015/0199939 A1 Jul. 16, 2015

(30) Foreign Application Priority Data
Jan. 14, 2014 (JP) .................... 2014-004562

(51) Int. Cl.
*G09G 5/02* (2006.01)
*H04N 1/60* (2006.01)

(52) U.S. Cl.
CPC .............. *G09G 5/02* (2013.01); *H04N 1/6058* (2013.01); *G09G 2340/06* (2013.01)

(58) Field of Classification Search
CPC ........ G09G 5/02; G09G 5/026; G06T 11/001; G06T 2207/10024
USPC ........... 345/590, 604, 690; 358/1.9, 518, 520; 382/162, 167
See application file for complete search history.

(56) References Cited

U.S. PATENT DOCUMENTS

| | | | |
|---|---|---|---|
| 6,930,809 B1 * | 8/2005 | Kagawa | H04N 1/6075 358/500 |
| 7,064,864 B2 * | 6/2006 | Takahashi | H04N 1/6058 345/589 |
| 7,433,104 B2 | 10/2008 | Cheo et al. | |
| 2007/0165946 A1 * | 7/2007 | Hong | H04N 1/6075 382/167 |
| 2008/0043268 A1 * | 2/2008 | Bang | G06T 11/001 358/1.9 |
| 2010/0039443 A1 * | 2/2010 | Mizukura | H04N 1/6058 345/590 |

(Continued)

FOREIGN PATENT DOCUMENTS

| | | |
|---|---|---|
| EP | 1 469 454 A2 | 10/2004 |
| JP | 2003-163814 A | 6/2003 |
| JP | 2009-218961 A | 9/2009 |

(Continued)

*Primary Examiner* — Kimberly A Williams
(74) *Attorney, Agent, or Firm* — Lee & Morse, P.C.

(57) ABSTRACT

The device includes a hue compensator converting hue of input signals having a first color gamut representing image data to hue conversion signals, a gamut converter outputting the input signals as gamut conversion signals having a second color gamut to display the input signals on an image display device representing the second color gamut, a blend coefficient setter that sets a blend coefficient defining a synthesis ratio of the hue conversion signals and the gamut conversion signals based on saturation obtained from the input signals, and a color synthesizer that generates synthesized image signals by synthesizing the hue conversion signals and the gamut conversion signals at a ratio according to the blend coefficient. The gamut converter performs conversion such that a value of each component of the hue conversion signals is from 0 to 1 when a value of each component of the input signals is from 0 to 1.

5 Claims, 9 Drawing Sheets

(56) References Cited

U.S. PATENT DOCUMENTS

| | | | |
|---|---|---|---|
| 2010/0188400 A1* | 7/2010 | Chen | G06T 7/0057 345/420 |
| 2011/0012920 A1* | 1/2011 | Saigo | G06T 11/001 345/601 |
| 2011/0084981 A1* | 4/2011 | Abe | H04N 1/6027 345/590 |
| 2013/0207996 A1* | 8/2013 | Shibuya | G06F 3/1454 345/604 |
| 2015/0015597 A1* | 1/2015 | Sano | H04N 1/6058 345/590 |

FOREIGN PATENT DOCUMENTS

| | | |
|---|---|---|
| JP | 2010-245709 A | 10/2010 |
| JP | 2011-155691 A | 8/2011 |
| JP | 2014-140160 A | 7/2014 |

\* cited by examiner

FIG. 4A

1) $S < S2$:
$$\alpha(S) = 1$$

2) $S = S2 + r_n(S1-S2) \leq S \leq S2 + r_{n+1}(S1-S2) = S_{n+1}$:
$$\alpha(S) = \alpha_n - \frac{(\alpha_n - \alpha_{n+1})(S2 + r_n(S2-S1) - S)}{(r_n - r_{n+1})(S1-S2)}$$
$$n = 0, 1, 2, 3 \ldots 10$$

3) $S1 < S$:
$$\alpha(S) = 0$$

FIG. 4B $S_n = S2 + r_n(S1-S2)$
$\alpha_n = \alpha$ value on each fitting point
$r_n$ = Coefficient determining S value $S_n$ of each fitting point

FIG. 4C

| n | 0 | 1 | 2 | 3 | 4 | 5 | 6 | 7 | 8 | 9 | 10 |
|---|---|---|---|---|---|---|---|---|---|---|---|
| $a_n$ | 1 | 0.96 | 0.9 | 0.82 | 0.5 | 0.33 | 0.19 | 0.1 | 0.04 | 0.01 | 0 |
| $r_n$ | 0 | 0.0851 | 0.1489 | 0.2128 | 0.383 | 0.5106 | 0.6383 | 0.7447 | 0.8511 | 0.9362 | 1 |

FIG. 6A

| [Mij] | hry | | | hgy | | | hgc | | |
|---|---|---|---|---|---|---|---|---|---|
| H(°) | 0 ~ 30 | 30 ~ 60 | 60 ~ 90 | 90 ~ 120 | 120 ~ 150 | 150 ~ 180 |
| Functions of Rin, Gin, and Bin | 0≤Gin-Bin ≤Rin-Gin | Gin-Bin≥ Rin-Gin≥0 | 0≤Gin-Rin ≤Rin-Bin | Gin-Bin≥ Rin-Gin≥0 | 0≤Bin-Rin ≤Gin-Bin | Bin-Rin≥ Gin-Bin≥0 |
| Definition of [Mij] | Gin-Bin | Rin-Gin | Gin-Rin | Rin-Bin | Bin-Rin | Gin-Bin |
| Calculation Result | Gin≤Gm ≤Rin | Gin≤Gm ≤Rin | Rin≤Rm ≤Gin | Rin≤Rm ≤Gin | Bin≤Bm ≤Gin | Bin≤Bm ≤Gin |

FIG. 6B

| [Mij] | hbc | | | hbm | | | hrm | | |
|---|---|---|---|---|---|---|---|---|---|
| H(°) | 180 ~ 210 | 210 ~ 240 | 240 ~ 270 | 270 ~ 300 | 300 ~ 330 | 330 ~ 360 |
| Functions of Rin, Gin, and Bin | 0≤Bin-Gin ≤Gin-Rin | Bin-Gin≥ Gin-Rin≥0 | 0≤Rin-Gin ≤Bin-Rin | Rin-Gin≥ Bin-Rin≥0 | 0≤Rin-Bin ≤Bin-Gin | Rin-Bin≥ Bin-Gin≥0 |
| Definition of [Mij] | Bin-Gin | Gin-Rin | Rin-Gin | Bin-Rin | Rin-Bin | Bin-Gin |
| Calculation Result | Gin≤Gm ≤Bin | Gin≤Gm ≤Bin | Rin≤Rm ≤Bin | Rin≤Rm ≤Bin | Bin≤Bm ≤Rin | Bin≤Bm ≤Rin |

IMAGE PROCESSING DEVICE AND IMAGE PROCESSING METHOD

CROSS-REFERENCE TO RELATED APPLICATION

Japanese Patent Application No. 2014-004562, filed on Jan. 14, 2014, in the Japanese Patent Office, and entitled: "Image Processing Device and Image Processing Method," is incorporated by reference herein in its entirety.

BACKGROUND

1. Field

Embodiments relate to an image processing device and an image processing method.

2. Description of the Related Art

Recently, in the field of a display device such as a liquid crystal display (LCD) or organic EL display, a color representation technology has been enhanced and a color reproduction region of the display device has been gradually expanded. In particular, a wider color reproduction region than an existing international standard for color reproduction, standard RGB (sRGB) or Adobe RGB is being implemented on an LCD using light emitting diode (LED) backlight or a self-emissive organic EL display.

For example, ITU-R Recommendation BT. 2020 defines a color space for UHDTV. According to the recommendation, image content having a wide color gamut according to the color space for UHDTV may be provided to a display device.

When the image content having the wide color gamut according to the color space for UHDTV is provided to the display device, a display device displayed with a typical color gamut such as a sRGB color space or an Adobe RGB color space has to display image content having a wider color gamut. Thus, when a signal corresponding to a wide color gamut is input to a display device having a narrow color gamut, the display device needs a color conversion technology to convert the wide color gamut into the narrow color gamut in order to implement good display.

However, in current color conversion technology, data after the color conversion may not be included in a range of 0 to 1 originally predicted, but may have a value less than 0 or greater than 1. The situation is defined as an overflow phenomenon. When there is overflow, data equal to or less than 0 is fixed to 0, and data equal to or greater than 1 is fixed to 1. Thus, the image may not be accurately displayed.

SUMMARY

Embodiments are directed to devices for processing an image including: a hue compensator that converts the hue of input signals having a first color gamut representing image data to output hue conversion signals; a gamut converter that outputs the input signals as gamut conversion signals having a second color gamut to display the input signals on an image display device representing the second color gamut narrower than the first color gamut; a blend coefficient setter that sets a blend coefficient defining a synthesis ratio of the hue conversion signals and the gamut conversion signals based on saturation obtained from the input signals; and a color synthesizer that generates synthesized image signals obtained by synthesizing the hue conversion signals and the gamut conversion signals at a ratio according to the blend coefficient, wherein the gamut conversion unit performs conversion such that a value of each component of the hue conversion signals is from 0 to 1 when a value of each component of the input signals is from 0 to 1.

In other embodiments, methods of processing an image include converting a hue of input signals having a first color gamut representing image data to output hue conversion signals, outputting the input signals as gamut conversion signals having a second color gamut to display the input signals on an image display device representing the second color gamut narrower than the first color gamut; setting a blend coefficient defining a synthesis ratio of the hue conversion signals and the gamut conversion signals based on saturation obtained from the input signals; and generating synthesized image signals obtained by synthesizing the hue conversion signals and the gamut conversion signals at a ratio according to the blend coefficient, wherein, when a value of each component of the input signals is from 0 to 1, conversion is performed such that a value of each component of the hue conversion signals to also become from 0 to 1.

BRIEF DESCRIPTION OF THE DRAWINGS

Features will become apparent to those of ordinary skill in the art by describing in detail exemplary embodiments with reference to the attached drawings in which:

FIGS. 4A and 4B illustrate the definition of a fitting function representing the blend coefficient $\alpha$ below a first limit S1 of the saturation in FIG. 3;

FIG. 4C illustrates values for defining a fitting function representing the blend coefficient $\alpha$ below a first limit S1 of the saturation in FIG. 3;

FIGS. 6A and 6B illustrate diagrams for explaining how to avoid overflow from occurring;

DETAILED DESCRIPTION

Figure 1:
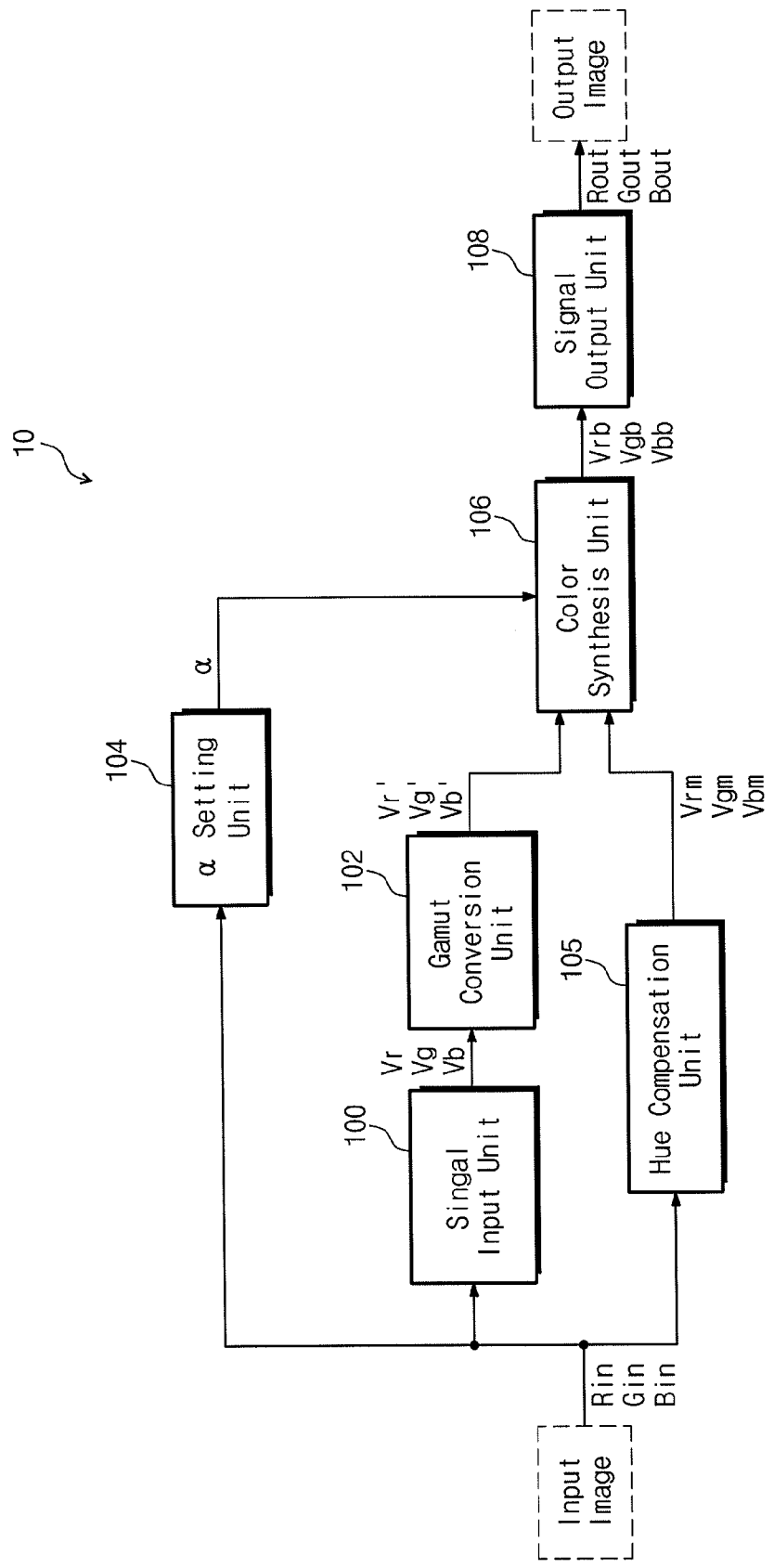
FIG. 1 illustrates a block diagram of an image device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Embodiments described in the disclosure are described with reference to plane views and cross-sectional views that are ideal, schematic diagrams. Thus, the forms of exemplary views may vary depending on manufacturing technologies and/or tolerances. Thus, embodiments are not limited to shown specific forms and also include variations in form produced according to manufacturing processes. Thus, regions illustrated in the drawings are exemplary, and the shapes of the regions illustrated in the drawings are intended to illustrate the specific shapes of the regions of elements and not to limit the disclosure.

Figure 2:
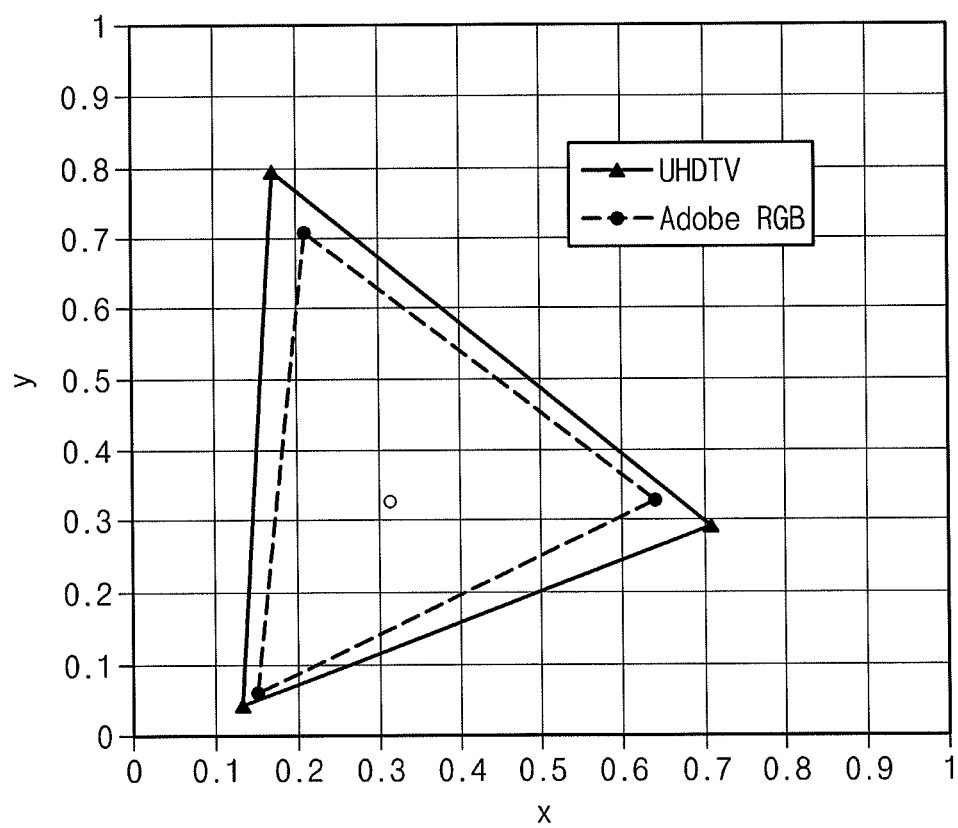
FIG. 2 illustrates a diagram showing the difference in a color gamut between UHDTV and Adobe RGB.
Figure 3:
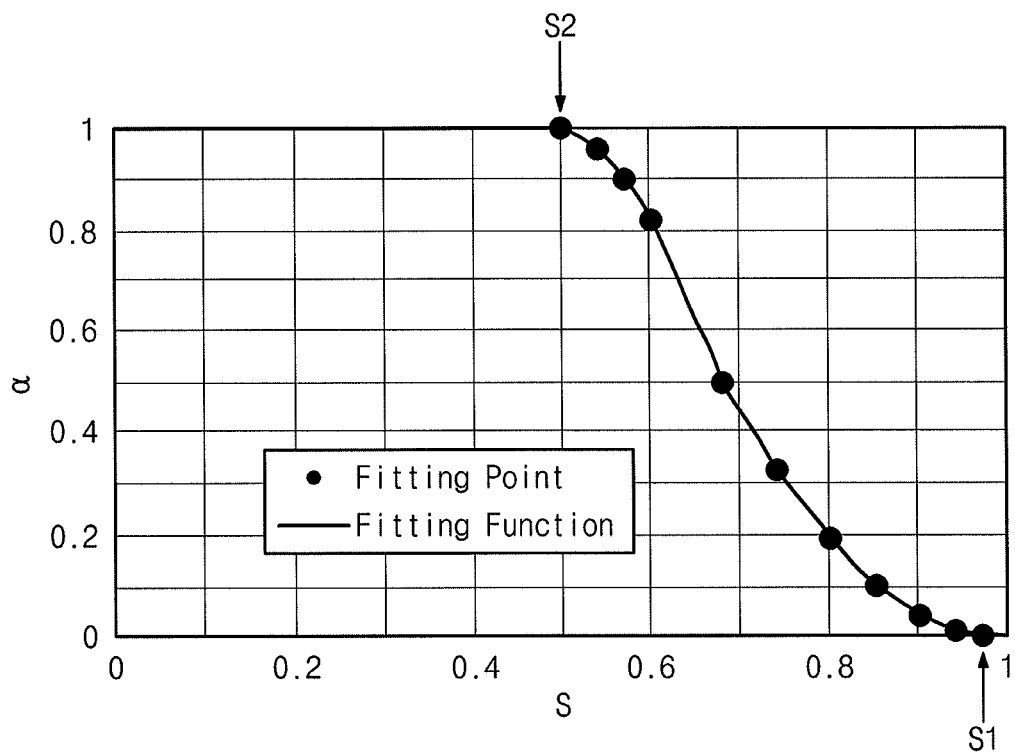
FIG. 3 illustrates a graph representing a level of blend (blend coefficient $\alpha$) by a fitting function below the limit S1 of saturation.

FIG. 1 is a block diagram of an image processing device according to an embodiment. FIG. 2 is a diagram showing the difference in a color gamut between UHDTV and Adobe RGB. FIG. 3 is a graph representing a level of blend (blend coefficient α) by a fitting function below the limit S1 of saturation. FIGS. 4A and 4B are the definition of a fitting function representing the blend coefficient α below a first limit S1 of the saturation in FIG. 3. FIG. 4C represents values for defining a fitting function representing the blend coefficient α below a first limit S1 of the saturation in FIG. 3.

Referring to FIGS. 1 to 4C, an image processing device 10 according to an embodiment includes a signal input unit 100, a gamut conversion unit 102, an α setting unit (blend coefficient setting unit) 104, a color compensation unit 105, a color synthesis unit 106, and a signal output unit 108.

The signal input unit 100 receives input signals Rin, Gin, and Bin that are input images. The input signals Rin, Gin, and Bin may be expressed by numerical values from 0 to 1. The signal input unit 100 performs exponential function conversion on each of received input signals Rin, Gin, and Bin to generate linear image signals Vr, Vg, and Vb.

The image signals Vr, Vg, and Vb are calculated by (1) in Equation 1. For example, when the input signals Rin, Gin, and Bin conform to sRGB, a gamma γ value is 2.2 and, thus, it is possible to generate image signals Vr, Vg, and Vb by raising the input signals to the 2.2nd power.

The image signals that may be obtained by raising the input signals Rin, Gin, and Bin to the gamma γ value power are linear image signals Vr, Vg, and Vb.

⟨Equation 1⟩

$$\begin{pmatrix} Vr \\ Vg \\ Vb \end{pmatrix} = \begin{pmatrix} (Rin)^\gamma \\ (Gin)^\gamma \\ (Bin)^\gamma \end{pmatrix} \quad (1)$$

The gamut conversion unit 102 uses a conversion matrix to convert the image signals Vr, Vg, and Vb generated at the signal input unit 100 into image signals having a narrow color gamut.

When a color gamut is converted from UHDTV into Adobe RGB, image signals are converted into image signals having a narrow color gamut, but embodiments are not limited thereto. For example, when the characteristic of a display does not match an Adobe RGB gamut, the color gamut of the image signals may be converted.

In a display device having a narrow color gamut, the gamut conversion unit 102 uses a conversion matrix to convert an image having a wide color gamut into an image having a narrow color gamut, and outputs image signals Vr', Vg' and Vb' obtained through conversion.

For example, when [Mwc] is a wide gamut conversion matrix, [Mnc] is a narrow gamut conversion matrix, and [Mc]=[Mnc]−1[Mwc], Relationships (2) and (3) in Equation 2 below are made.

⟨Equation 2⟩

$$\begin{pmatrix} X \\ Y \\ Z \end{pmatrix} = [Mwc] \begin{pmatrix} Vr \\ Vg \\ Vb \end{pmatrix} = [Mnc] \begin{pmatrix} Vr' \\ Vg' \\ Vb' \end{pmatrix} \quad (2)$$

$$\begin{pmatrix} Vr' \\ Vg' \\ Vb' \end{pmatrix} = [Mnc]^{-1}[Mwc] \begin{pmatrix} Vr \\ Vg \\ Vb \end{pmatrix} = [Mc] \begin{pmatrix} Vr \\ Vg \\ Vb \end{pmatrix} \quad (3)$$

For purpose of explanation, an UHDTV gamut under ITU-R Recommendation BT. 2020 is a wide color gamut and an Adobe RGB gamut is a narrow color gamut, and a gamut conversion operation in such a case is exemplarily described.

Table 1 represents CIE xy coordinate values of each of UHDTV and Adobe RGB, FIG. 2 shows a CIE xy chromacity diagram of each of UHDTV and Adobe RGB. A white color has the same value. As shown in FIG. 2, an UHDTV gamut has a wider color gamut than an Adobe RGB gamut.

When at least one of the coordinate points of R, G and B values on the CIE xy chromacity diagram or the CIE xy coordinate values is inside a wide gamut coordinate, it is defined as a narrow color gamut. In particular, when the boundary of the color gamut is inside the wide color gamut, it may be defined as a narrow color gamut.

For example, when a color coordinate corresponding to B on the CIE xy chromacity diagram is outside UHDTV but a color coordinate corresponding to R and G is inside the UHDTV, it is defined as a narrow color gamut.

TABLE 1

CIE xy Coordinate values of UHDTV and Adobe RGB

| | UHDTV | | Adobe RGB | |
|---|---|---|---|---|
| | x | y | x | y |
| R | 0.708 | 0.292 | 0.640 | 0.330 |
| G | 0.170 | 0.797 | 0.210 | 0.710 |
| B | 0.131 | 0.046 | 0.150 | 0.060 |
| W | 0.3127 | 0.329 | 0.3127 | 0.329 |

Tables 2 to 4 represent the conversion matrices of UHDTV and Adobe RGB and [Mc] of Relationship (3) above.

TABLE 2

[Mwc] Conversion Matrix of UHDTV

| 0.6361 | 0.1450 | 0.1694 |
|---|---|---|
| 0.2624 | 0.6785 | 0.0592 |
| 0.0001 | 0.0284 | 1.0606 |

TABLE 3

[Mnc] Conversion Matrix of Adobe RGB

| 0.5767 | 0.1856 | 0.1882 |
|---|---|---|
| 0.2973 | 0.6274 | 0.0753 |
| 0.0270 | 0.0707 | 0.9913 |

TABLE 4

[Mc] = [Mnc]−1[Mwc]

| 1.1503 | −0.0971 | −0.0532 |
|---|---|---|
| −0.1243 | 1.1334 | −0.0091 |
| −0.0224 | −0.0496 | 1.0720 |

The α setting unit 104 sets the blend coefficient α based on saturation S obtained from input signals Rin, Gin, and Bin.

The blend coefficient α defines the synthesis ratio of image signals Vrm, Vgm, and Vbm output from the hue compensation unit 105 to be described below and image signals Vr', Vg', and Vb' output from the gamut conversion unit 102.

One of reasons for setting the blend coefficient α is to make the characteristic of an output image having a narrow color gamut close to that of an input image having a wide color gamut. Depending on the synthesis ratio, when the blend coefficient α is 1, the image signals Vr', Vg', and Vb' become 100% and, when the blend coefficient α is 0, the image signals Vrm, Vgm, and Vbm become 100%.

Under the condition that the image signals Vr', Vg', and Vb' after color conversion correspond to the boundary of a color gamut, the α setting unit 104 may previously examine how input RGB data is distributed in an HSV color space, and then determine the blend coefficient. In this example, an image display device having a narrow color gamut performs the inverse conversion of a conversion matrix for displaying a wide color gamut, performs exponential function conversion, finds R, G, and B data, and calculates HSV values.

In addition, the α setting unit 104 defines the values of brightness V and/or saturation S that may avoid overflow and sets the blend coefficient α depending on whether the brightness V and the saturation S are equal to or larger than defined values S1 and V1 or smaller than them.

The α setting unit 104 sets the blend coefficient α to 0 when the values of brightness V and/or saturation S are equal to or larger than S1 and V1, and sets the blend coefficient α to a value between 0 and 1 when they are smaller than the defined values S1 and V1.

The α setting unit 104 may also use a function to set α so that a changes between 0 and 1 when brightness V and/or saturation S are smaller than the defined values S1 and V1. For example, in the relation between saturation S and α, α smaller than S1 may be set by using an exponential function, a linear function, a sigmoid function or a fitting function. Also, in the relation between brightness V and α, α smaller than V1 may be set using a linear function.

The color synthesis unit 106 synthesizes the image signals Vr, Vg, and Vb generated at the signal input unit 100 and the image signals Vr', Vg', and Vb' generated at the gamut conversion unit 102 at a synthesis ratio according to the blend coefficient α set at the blend coefficient setting unit 104.

In this example, α decreases under the condition that the image signals Vr', Vg, and Vb' overflow and α increases under the condition that they do not overflow. The color synthesis unit 106 generates and outputs synthesized image signals Vrb, Vgb, and Vbb.

In particular, the color synthesis unit 106 blends obtained image signals Vrm, Vgm, and Vbm and image signals Vr', Vg', and Vb' by using the blend coefficient α and generates synthesized image signals Vrb, Vgb, and Vbb. The synthesized image signals Vrb, Vgb, and Vbb may be found using Relationship (4) in Equation 3.

⟨Equation 3⟩

$$\begin{pmatrix} Vrb \\ Vgb \\ Vbb \end{pmatrix} = (1-\alpha) \begin{pmatrix} Vrm \\ Vgm \\ Vbm \end{pmatrix} + \alpha \begin{pmatrix} Vr' \\ Vg' \\ Vb' \end{pmatrix} \qquad (4)$$

When α is 1, the synthesized image signals Vrb, Vgb, and Vbb are the image signals Vr', Vg', and Vb', and when a is 0, the synthesized image signals Vrb, Vgb, and Vbb are the image signals Vrm, Vgm, and Vbm. When α is larger than 0 and smaller than 1, the synthesized image signals Vrb, Vgb, and Vbb are set to values obtained by splitting the image signals Vrm, Vgm, and Vbm, and the image signals Vr', Vg', and Vb' according to the ratio of α.

The signal output unit 108 receives the synthesized image signals Vrb, Vgb, and Vbb from the color synthesis unit 106. The signal output unit 108 performs exponential function conversion on the synthesized image signals Vrb, Vgb, and Vbb to generate output signals Rout, Gout and Bout. For example, 1/2.2 exponential function conversion is performed on the synthesized image signals Vrb, Vgb, and Vbb, and a required number of bits of signals Rout, Gout, and Bout are generated. The output signals Rout, Gout, and Bout are provided to an image display device such as a display and a projector.

In an sRGB color space, a gamma value γ is 2.2 and thus the output signals Rout, Gout, and Bout may be generated by Equation 4.

⟨Equation 4⟩

$$\begin{pmatrix} Rout \\ Gout \\ Bout \end{pmatrix} = \begin{pmatrix} (Vrb)^{1/\gamma} \\ (Vgb)^{1/\gamma} \\ (Vbb)^{1/\gamma} \end{pmatrix} \qquad (7)$$

In the following, a method of setting the value of α smaller than S1 by using a fitting function is described.

For example, the lower bound S1 of saturation S making the value of α=0 and the upper bound S2 of saturation S making the value of α=1 are determined. That is, when the value of saturation S is smaller than S2, the value of α becomes 1, and when the value of saturation S exceeds S1, the value of α becomes 0.

When the value of saturation S is S1 to S2, it is possible to determine fitting points represented by a plurality of round points to determine the value of α by using a fitting function passing through the points when the value of saturation S is S1 to S2, as shown in FIG. 3.

When the value of α for the value of saturation S is denoted by α(S), α(S) may be determined by a fitting function by ten fitting points as shown in FIG. 4A.

Also, αn and rn in FIG. 4A are respectively values determining the value of a in each fitting point and Sn of each fitting point and defined as Sn=S2+rn(S1−S2), as shown in FIG. 4B. Also, examples of the numeric values of αn and rn are as shown in FIG. 4C.

Figure 5:
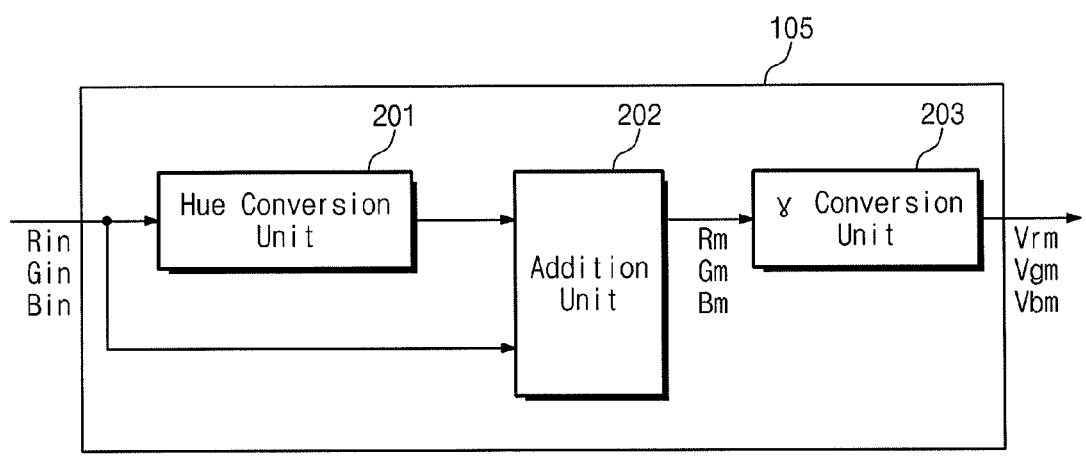
FIG. 5 illustrates a block diagram representing a configuration of a hue compensation unit in FIG. 1.
Figure 7A:
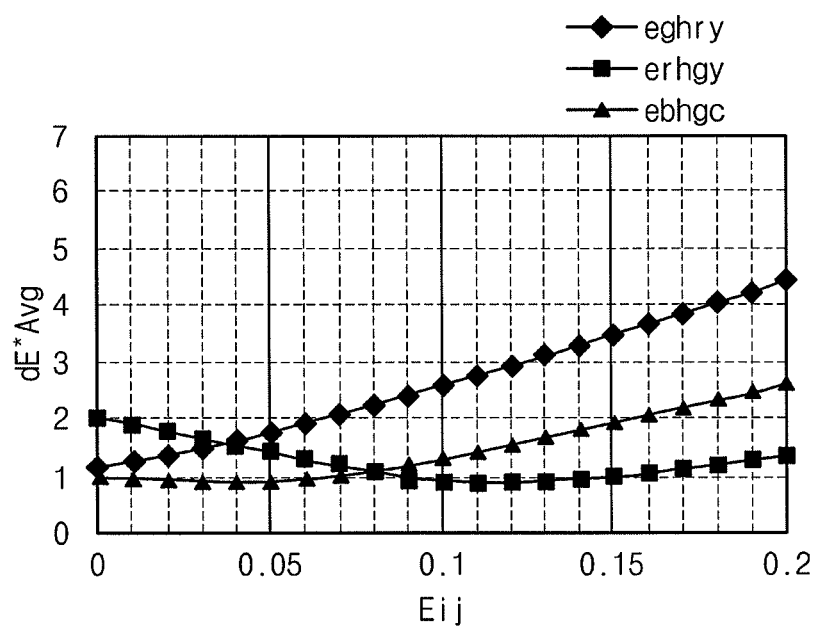
FIGS. 7A and 7B illustrate diagrams for explaining how to determine a hue matrix coefficient.
Figure 7B:
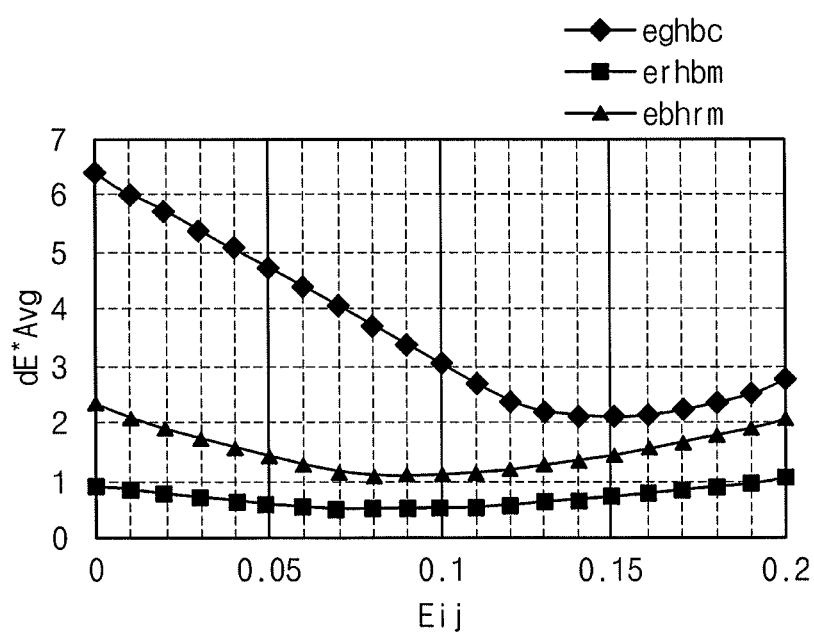
Figure 8:
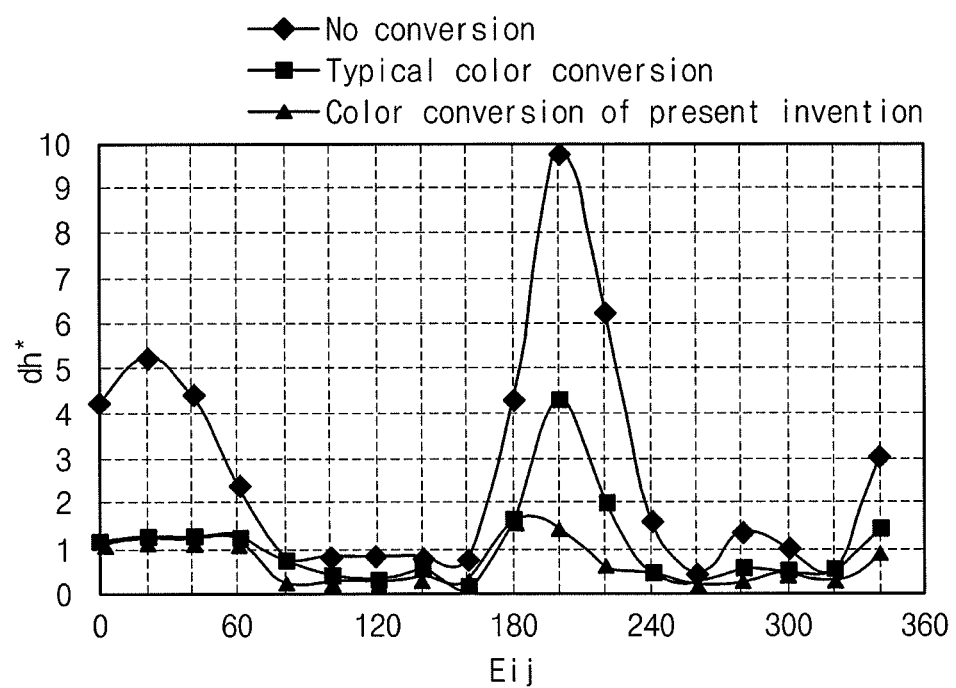
FIG. 8 illustrates a diagram for comparing various conversions of UHDTV into Adobe RGB.

FIG. 5 is a block diagram representing a configuration of the hue compensation unit 105 in FIG. 1. FIGS. 6A and 6B are diagrams for explaining how to avoid overflow from occurring. FIGS. 7A and 7B are diagrams for explaining how to determine a hue matrix coefficient. FIG. 8 is a diagram for comparing various conversions of UHDTV into Adobe RGB.

Referring FIGS. 5 to 6B, the hue compensation unit 105 converts the hue of image data represented by input signals Rin, Gin, and Bin to generate output signals Vrm, Vgm, and Vbm. In this case, the values of the components of output signals are from 0 to 1 when the values of the components of corresponding input signals are from 0 to 1.

The hue compensation unit 105 includes a hue conversion unit 201, an addition unit 202, and a γ conversion unit 203.

The hue conversion unit 201 calculates the product of matrices represented by Relationship (8) in Equation 5.

<Equation 5>

$$[Eij][Mij]^T \qquad (8)$$

In this example, [Mij] is a vector defined as [Mij]=(hry, hgy, hgc, hbc, hbm, hrm) (9) by using functions hry, hgy, hgc, hbc, hbm, and hrm set to have an increasing value when input signals Rin, Gin, and Bin are near each hue of H=30°, 90°, 150°, 210°, 270°, and 330°.

In this example, hry, hgy, hgc, hbc, hbm, and hrm are defined as follows:

hry: a function in which input data is Gin−Bin at H=0° to 30°, is Rin−Gin at H=30° to 60°, and is 0° at other Hs, hgy: a function in which input data is Gin−Rin at H=60° to 90°, is Rin−Bin at H=90° to 120°, and is 0° at other Hs, hgc: a function in which input data is Bin−Rin at H=120° to 150°, is Gin−Bin at H=150° to 180°, and is 0° at other Hs, hbc: a function in which input data is Bin−Gin at H=180° to 210°, is Gin−Rin at H=210° to 240°, and is 0° at other Hs, hbm: a function in which input data is Rin−Gin at H=240° to 270°, is Bin−Rin at H=270° to 300°, and is 0° at other Hs, and hrm: a function in which input data is Rin−Bin at H=300° to 330°, is Bin−Gin at H=330° to 360°, and is 0° at other Hs.

Also, [Eij] is a matrix represented by Relationship (10) in Equation 6 having values from 0 to 1 (eghry, erhgy, ebhgc, eghbc, erhbm, ebhrm) as components and having 0 as the values of other components.

⟨Equation 6⟩

$$[Eij] = \begin{pmatrix} 0 & erhgy & 0 & 0 & erhbm & 0 \\ eghry & 0 & 0 & eghbc & 0 & 0 \\ 0 & 0 & ebhgc & 0 & 0 & ebhrm \end{pmatrix} \quad (10)$$

Thus, by Relationship (8) in Equation 5, the following vectors having three values are obtained and output from the hue conversion unit 201.

$erhgy \cdot hgy + erhbm \cdot hbm$ $eghry \cdot hry + eghbc \cdot hbc$ $ebhgc \cdot hgc + ebhrm \cdot hrm$ ⟨Equation 7⟩

The addition unit 202 outputs signals Rm, Gm, and Bm that may be obtained by adding the outputs from the hue conversion unit 201 to input signals Rin, Gin, and Bin. Thus, the signals Rm, Gm, and Bm output from the addition unit 202 may be represented by Relationship (11) in Equation 8.

⟨Equation 8⟩

$$\begin{pmatrix} Rm \\ Gm \\ Bm \end{pmatrix} = \begin{pmatrix} Rin \\ Gin \\ Bin \end{pmatrix} + [Eij][Mhij]^T \quad (11)$$

The γ conversion unit 203 performs γ conversion on the signals Rm, Gm and Bm provided from the addition unit 202. In particular, signals Vrm, Vgm, and Vbm are output by the raising of the value of each component of the signals Rm, Gm, and Bm to γ (e.g., 2.2) power. That is, the γ conversion unit 203 obtains the signals Vrm, Vgm, and Vbm according to Relationship (12) in Equation 9.

⟨Equation 9⟩

$$\begin{pmatrix} Vrm \\ Vgm \\ Vbm \end{pmatrix} = \begin{pmatrix} (Rm)^\gamma \\ (Gm)^\gamma \\ (Bm)^\gamma \end{pmatrix} \quad (12)$$

In this example, FIGS. 6A and 6B may represent that each of the signals Rm, Gm, and Bm is between 0 and 1.

For example, hry is represented by Gm=Gin+eghry·hry+hghbc·hbc in Relationship (10). In this example, by the definitions of hry and hbc, hry is defined as Gin−Bin when 0°<=H<=30°, defined as Rin−Gin when 30°<=H<=60°, and defined as 0° in other cases. The function hbc is defined as 0° when 0°<=H<=60°. In this example, 0°<=H<=60° may be divided into 0°<=H<=30° and 30°<=H<=60°.

When 0°<=H<=30°, the relation 0<=Gin−Bin<=Rin−Gin is made as shown in FIG. 6A. Also, hry is Gin−Bin. Thus, Gm=Gin+eghry·hry+hghbc·hbc=Gin+eghry·(Gin−Bin). In this example, since the component eghry of a matrix [Eij] is defined as 0 to 1, Gin<=Gm<=Gin+Gin−Bin. In this example, Gin<=Gm<=Gin+Rin−Gin=Rin is drawn from the relation 0<=Gin−Bin<=Rin−Gin, and when Rin and Gin are from 0 to 1, Gm is also from 0 to 1.

When 30°<=H<=60°, the relation Gin−Bin>=Rin−Gin>=0 is made as shown in FIG. 6A. Also, hry is Rin−Gin. Thus, Gm=Gin+eghry·hry+hghbc·hbc=Gin+eghry·(Rin−Gin). In this example, since the component eghry of the matrix [Eij] is defined as 0 to 1, Gin<=Gm<=Gin+Rin−Gin=Rin, and when Rin and Gin are 0 to 1, Gm is also 0 to 1.

Likewise, when 180°<=H<=210°, e.g., hbc is as follows. As shown in FIG. 6B, the relation 0<=Bin−Gin<=Gin−Rin is made and hbc is Bin−Gin. Thus, Gm=Gin+eghry·hry+hghbc·hbc=Gin+hghbc·(Bin−Gin). In this example, since the component eghry of the matrix [Eij] is defined as from 0 to 1, Gin<=Gm<=Gin+Rin−Gin=Rin, and when Rin and Gin are from 0 to 1, Gm is also from 0 to 1.

Each of Rm, Gm and Bm may be from 0 to 1 and, thus, each of Vrm, Vgm and Vbm output from the γ conversion unit may also be from 0 to 1. Therefore, when each of Vr', Vg' and Vb' output from the gamut conversion unit is from 0 to 1, a synthesis result by α of 0 to 1 also becomes from 0 to 1 and may avoid overflow.

In the following, it is described how each component of the matrix [Eij] is determined.

The angle H varies, the boundary of a wide color gamut of S=1 and V=1 (UHDTV in the present embodiment) and the boundary of a narrow color gamut of S=1 and V=1 (Adobe RGB in the present embodiment) are converted into an L*a*b space and h*(=a tan(b*/a*)) is calculated. The average dh*Avg of the difference dh* between h* of the boundary of the wide color gamut and the h* of the boundary of the narrow color gamut is calculated.

In addition, the value of each component of the matrix [Eij] varies to any designated upper bound of 0 to 1 and an optimal condition value at which dh*Avg is minimized is found. For example, when the value of each component of the matrix [Eij] varies from 0 to 0.2, dh*Avg is as represented in FIGS. 7a and 7B. When a value making dh*Avg minimum is found on each component from results represented in FIGS. 7A and 7B, particular examples of [Eij] are obtained as follows.

⟨Equation 10⟩

$$[Eij] = \begin{pmatrix} 0 & erhgy & 0 & 0 & erhbm & 0 \\ eghry & 0 & 0 & eghbc & 0 & 0 \\ 0 & 0 & ebhgc & 0 & 0 & ebhrm \end{pmatrix} = \quad (11)$$

$$\begin{pmatrix} 0 & 0.11 & 0 & 0 & 0.08 & 0 \\ 0 & 0 & 0 & 0.15 & 0 & 0 \\ 0 & 0 & 0.04 & 0 & 0 & 0.09 \end{pmatrix}$$

Next, for conversion from UHDTV into Adobe RGB, (1) when there is no conversion (it is analyzed that the value of UHDTV is the same as that of Adobe RGB), (2) when a hue compensation unit does not operate (Rm=Rin, Gm=Gin, Bm=Bin), and (3) when H varies in an embodiment, a graph according to a variation in dh* as described above is shown in FIG. 8. As shown in FIG. 8, according to an embodiment, dh* decreases near H=90° and 210° corresponding to erhgy and eghbc at which the coefficient of [Eij] is large. Also, when H=200°, dh* significantly decreases in comparison to other cases.

Although conversion from UHDTV into Adobe RGB has been discussed above, other color conversions may also obtain the same effect.

The image processing device and the image processing method may prevent overflow.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, controller, or other signal processing device which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A device for processing an image, the device comprising:
   a hue compensator that converts a hue of input signals having a first color gamut representing image data to output hue conversion signals;
   a gamut converter that outputs gamut conversion signals by converting the input signals, the gamut conversion signals having a second color gamut to display the input signals on an image display device representing the second color gamut narrower than the first color gamut;
   a blend coefficient setter that sets a blend coefficient defining a synthesis ratio of the hue conversion signals and the gamut conversion signals based on saturation obtained from the input signals; and
   a color synthesizer that generates synthesized image signals by synthesizing the hue conversion signals and the gamut conversion signals at a ratio according to the blend coefficient,
   wherein the hue compensator converts the hue of the input signals such that a value of each component of the hue conversion signals is from 0 to 1 when a value of each component of the input signals is from 0 to 1, and wherein,
   the hue conversion signals and the input signals satisfy Equation 1 when the input signals become (Rin, Gin, Bin)$^T$ and the hue conversion signals become (Rm, Gm, Bm)$^T$:

$$\begin{pmatrix} Rm \\ Gm \\ Bm \end{pmatrix} = \begin{pmatrix} Rin \\ Gin \\ Bin \end{pmatrix} + [Eij][Mij]^T, \qquad \text{<Equation 1>}$$

[Eij] and [Mij] are matrices, a value of each component of [Eij] is a constant being 0 to 1, a value of each component of [Mij] is a function of the input signals, and a value of each component of [Mij] is from 0 to 1.

2. The device as claimed in claim 1, wherein [Eij] is

⟨Equation 2⟩

$$\begin{pmatrix} 0 & erhgy & 0 & 0 & erhbm & 0 \\ eghry & 0 & 0 & eghbc & 0 & 0 \\ 0 & 0 & ebhgc & 0 & 0 & ebhrm \end{pmatrix},$$

eghry, erhgy, ebhgc, eghbc, erhbm, and ebhrm are from 0 to 1, [Mij] is (hry, hgy, hgc, hbc, hbm, hrm),
hry is a function in which input data is Gin−Bin at H=0° to 30°, is Rin−Gin at H=30° to 60°, and is 0° at other Hs,
hgy is a function in which input data is Gin−Rin at H=60° to 90°, is Rin−Bin at H=90° to 120°, and is 0° at other Hs,
hgc is a function in which input data is Bin−Rin at H=120° to 150°, is Gin−Bin at H=150° to 180°, and is 0° at other Hs,
hbc is a function in which input data is Bin−Gin at H=180° to 210°, is Gin−Rin at H=210° to 240°, and is 0° at other Hs,
hbm is a function in which input data is Rin−Gin at H=240° to 270°, is Bin−Rin at H=270° to 300°, and is 0° at other Hs, and
hrm is a function in which input data is Rin−Bin at H=300° to 330°, is Bin−Gin at H=330° to 360°, and is 0° at other Hs.

3. The device as claimed in claim 2, wherein a value of a component of the [Eij] is selected to convert a boundary of the first color gamut and a boundary of the second color gamut into an L*a*b space, calculate h*=atan(b*/a*), calculate an average dh*Avg of a difference dh* between the boundary h* of the wide color gamut and the boundary h* of the narrow color gamut, change the eghry, erhgy, ebhgc, eghbc, erhbm and ebhrm to any designated upper bound of 0 to 1, and make dh*Avg minimum.

4. The device as claimed in claim 2, wherein the [Eij] is:

⟨Equation 3⟩

$$\begin{pmatrix} 0 & 0.11 & 0 & 0 & 0.08 & 0 \\ 0 & 0 & 0 & 0.15 & 0 & 0 \\ 0 & 0 & 0.04 & 0 & 0 & 0.09 \end{pmatrix}.$$

5. A method of processing an image, the method comprising:
- converting a hue of input signals having a first color gamut representing image data to output hue conversion signals;
- outputting gamut conversion signals by converting the input signals, the gamut conversion signals having a second color gamut to display the input signals on an image display device representing the second color gamut narrower than the first color gamut;
- setting a blend coefficient defining a synthesis ratio of the hue conversion signals and the gamut conversion signals based on saturation obtained from the input signals; and
- generating synthesized image signals obtained by synthesizing the hue conversion signals and the gamut conversion signals at a ratio according to the blend coefficient, wherein
- when a value of each component of the input signals is from 0 to 1, a value of each component of the hue conversion signals is from 0 to 1, and wherein, the hue conversion signals and the input signals satisfy Equation 1 when the input signals become $(Rin, Gin, Bin)^T$ and the hue conversion signals become $(Rm, Gm, Bm)^T$:

$$\begin{pmatrix} Rm \\ Gm \\ Bm \end{pmatrix} = \begin{pmatrix} Rin \\ Gin \\ Bin \end{pmatrix} + [Eij][Mij]^T, \quad \text{<Equation 1>}$$

[Eij] and [Mij] are matrices, a value of each component of [Eij] is a constant being 0 to 1, a value of each component of [Mij] is a function of the input signals, and a value of each component of [Mij] is from 0 to 1.

* * * * *